United States Patent [19]

Brown

[11] Patent Number: 5,152,926
[45] Date of Patent: Oct. 6, 1992

[54] REFRIGERANT LUBRICANT COMPOSITIONS

[75] Inventor: William L. Brown, Pleasantville, N.Y.

[73] Assignee: Union Carbide Chemicals & Plastics Technology Corporation, Danbury, Conn.

[21] Appl. No.: 579,720

[22] Filed: Sep. 10, 1990

Related U.S. Application Data

[63] Continuation-in-part of Ser. No. 360,984, Jun. 2, 1989, Pat. No. 4,971,712.

[51] Int. Cl.⁵ ............... C10M 141/02; C10M 141/04
[52] U.S. Cl. .................... 252/32.5; 252/32.007 E; 252/52 A; 252/68; 252/47; 252/51; 252/32.5; 252/32.7 E
[58] Field of Search ............... 252/32.7 E, 52 A, 68, 252/47, 32.5, 47.5, 51

[56] References Cited

U.S. PATENT DOCUMENTS

| | | | |
|---|---|---|---|
| 4,170,564 | 10/1979 | Brendle | 252/68 |
| 4,248,726 | 2/1981 | Uchinuma et al. | 252/68 |
| 4,267,064 | 5/1981 | Sasaki et al. | 252/68 |
| 4,311,024 | 1/1982 | Itoh et al. | 252/68 |
| 4,428,854 | 1/1984 | Enjo et al. | 252/68 |
| 4,470,272 | 9/1984 | Itoh et al. | 252/68 |
| 4,751,012 | 6/1988 | Ward et al. | |
| 4,755,316 | 7/1988 | Magid et al. | 252/68 |
| 4,767,554 | 8/1988 | Malito et al. | 252/49.5 |
| 4,851,144 | 7/1989 | McGraw et al. | 252/68 |
| 4,916,914 | 4/1990 | Short | 62/84 |
| 4,950,415 | 8/1990 | Malito | 252/49.3 |

*Primary Examiner*—Jacqueline Howard
*Attorney, Agent, or Firm*—W. K. Volles

[57] ABSTRACT

Antiwear additives for refrigerant lubricant compositions and refrigerant lubricant compositions containing said antiwear additives are disclosed for use in compression refrigeration applications.

20 Claims, No Drawings

REFRIGERANT LUBRICANT COMPOSITIONS

This application is a continuation-in-part of Ser. No. 07/360,984 filed Jun. 2, 1989, now U.S. Pat. No. 4,971,712 issued Nov. 20, 1990.

FIELD OF THE INVENTION

This invention relates to lubricants used with refrigerants in compression refrigeration and air-conditioning systems. More particularly, it relates to lubricants for use with tetrafluoroethanes, e.g. 1,1,1,2-tetrafluoroethane (FC-134a), 1,1,2,2-tetrafluoroethane (HFC-134), and of lesser importance, pentafluoroethane (HFC 125). These refrigerants are being considered as replacements for dichlorodifluoromethane (CFC-12), particularly in automotive air conditioning systems. This invention also relates to the additives useful in refrigerant lubricant compositions.

BACKGROUND OF THE INVENTION

Refrigeration systems that use CFC-12 as the refrigerant generally used mineral oils to lubricate the compressor. (See for example the discussion in Chapter 32 of the 1980 ASHRAE Systems Handbook.). CF-12 is completely miscible with such oils throughout the entire range of refrigeration system temperatures, i.e., $-45°$ C. to $65°$ C. In automotive air-conditioning, paraffinic and naphthenic oils of about 500 SUS viscosity of $100°$ F. are used with CFC-12. These oils have "pour points" below $-20°$ C. and are completely miscible with the CFC-12 refrigerants over the range of temperatures from $-10°$ C. to $100°$ C. Consequently, oil which dissolves in the refrigerant travels throughout the refrigeration loop in the air conditioning system and returns with the refrigerant to the compressor. It does not separate during condensation, although it may accumulate because of the low temperature when the refrigerant is evaporated. At the same time, this oil which lubricates the compressor will contain some refrigerant which, in turn, may affect its lubricating properties.

When substituting HFC-134a or HFC-134 for CFC-12 in these refrigeration systems, it would be desirable to be able to use the same mineral oils as used with CFC-12. It would not require any substantial change in equipment nor any significant changes in conditions used for the system. If lubricant separates from refrigerant during operation of the system, serious problems may result, i.e. the compressor could be inadequately lubricated. This would be most serious in automotive air-conditioning systems because the compressors are not separately lubricated and a mixture of refrigerant and lubricant circulates throughout the entire system. Unfortunately, however, the mineral oils are substantially immiscible with the tetrafluoroethanes.

Two recent publications of ASHRAE discuss the problems associated with separation of lubricants and refrigerants. These are "Fundamentals of Lubrication in Refrigerating Systems and Heat Pumps" Kruse and Schroeder ASHRAE Transactions Vol. 90 Part 2B, pps 763–782, 1984 and "Evaluation of Lubricants for Refrigeration and Air-Conditioning Compressors" Spauschus ibid pps. 784–798.

In summary, refrigerants which are not completely miscible with an oil in the full range of mixture compositions and operating temperatures may become miscible or immiscible as the temperature is raised or lowered from room temperature. The areas of immiscibility may assume a variety of shapes, i.e. parabolic or non-parabolic. As a parabola, the curve of miscibility temperature vs. percent oil in the mixture, may have its open or concave portion facing the low or high temperatures. The closed or convex portion of the parabolic curve identifies, respectively, the maximum or minimum temperature above or below which the refrigerant and the lubricating oil are completely miscible. These temperatures are referred to as the maximum or minimum "consolute temperatures." Besides parabolas, these curves can assume skewed parabolic shapes or curves of varying slope wherein immiscibility occurs above or below the curve.

One of the objects of this invention is to provide a combination of lubricating oil and tetrafluoroethane, e.g. HFC-134a, where the area of miscibility encompasses the full ranges of temperature and composition encountered in compression refrigeration, i.e. completely miscibility occurs for all compositions in the range of $-45°$ C. to at least $20°$ C. Another object is to provide a process for using such compositions in compression refrigeration. Another object is to provide antiwear additive packages for refrigerant lubricants.

PRIOR ART

U.S. Pat. No. 4,248,726, issued Feb. 5, 1981, and U.S. Pat. No. 4,267,064, issued May 12, 1981, both to Nippon Oil Co. et al., relate to the use of a polyglycol oil such as polyoxypropylene glycol (or an alkyl ether thereof) having a viscosity index of at least 150 and a glycidyl ether type epoxy compound as a high viscosity refrigeration oil composition for halogen-containing refrigerants. These polyglycol/glycidyl ether compositions are disclosed for use with Freon ® 11, 12, 13, 22, 113, 114, 500 and 502; and as being "particularly effective" with Freon ® 12 or 22.

*Research Disclosure* 17486 entitled "Refrigeration Oil" by E. I. duPont de Nemours & Co. discloses polyalkylene glycols such as "Ucon" LB-165 and "Ucon" LB-525 sold by Union Carbide Corporation, for use with HFC-134a. These glycols are polyoxypropylene glycols that are mono-functional and are prepared from propylene oxide initiated with n-butanol. The publication states that these combinations of oil and refrigerant are miscible in all proportions at temperatures at least as low as $-50°$ C. and are thermally stable in the presence of steel, copper and aluminum at $175°$ C. for about six days.

U.S. Pat. No. 4,755,316, issued July 5, 1988, to Allied-Signal Inc. also relates to the use of polyalkylene glycols. However, these glycols are at least difunctional with respect to hydroxyl groups and contains at least 80% propylene oxide units relative to the total, the remaining 20% may derive from ethylene or butylene oxide or esters, olefins and the like which are polymerizable with propylene oxide. It should be noted that only 100% oxypropylene units in the difunctional PAG's are exemplified in this patent.

SUMMARY OF THE INVENTION

The present invention is based on the discovery that the use of a sufficient amount to lubricate, usually 10–20% by volume for automotive use, but some situations as high as 50% by volume, of at least one monofunctional random polyalkylene glycol (PAG), also referred to as polyoxyalkylene glycol, based on a significant amount of ethylene oxide and propylene oxide, preferably from 25%–75% ethylene oxide and, correspondingly, 75%–25% propylene oxide, will be completely miscible with tetrafluoroethane and pentafluoroethane, usually 80–90%, sometimes as much as 50–90% by volume of the tetrafluoroethanes, e.g., HFC-134 and HFC-134a, or pentafluoroethane, HFC-125, or blends thereof with each other and with other refrigerants in the range of temperatures from −40° C. to at least 20° C. The more preferred weight percents of oxypropylene units and oxyethylene units in the random PAG are from 40–60% to 60–40%, respectively; and the most preferred ratio is about 50:50. The weight ratio of refrigerant to the PAG lubricant in the mixtures used for refrigeration may be anywhere from 99/1 to 1/99, preferably 99/1 to 70/30. The viscosities of these oils may be anywhere from 100 to 1200 SUS and for most commercial uses, from 400 to 1000 SUS. The present invention is also based on the discovery that certain materials provide antiwear properties to be lubricants with the above-identified halohydrocarbons, such materials also being known as "extreme pressure additives".

The process of manufacturing these mono-functional PAGs may involve initiation with methanol, ethanol, propanol or butanol. The last mentioned, butanol, is the preferred initiator; and the process of manufacture is described in the Encyclopedia of Polymer Science and Engineering, Volume 6, pps, 226–273; "Ethylene Oxide Polymers and Copolymers" by Clinton and Matlock, 2nd edition, 1986, John Wiley & Sons.

It has also been found that the use of 0.1–1.3% of an "extreme pressure (EP) additive" improves the lubricity and load-bearing characteristics of the oil and thus improves the quality of the refrigerant-lubricant compositions of this invention. EP additives for use in the invention are included among these disclosed in Table D of U.S. Pat. No. 4,755,316. The preferred ones are the organic phosphates and include Lubrizol ® 1097, a zinc (dialkyl dithio) phosphate manufactured by the Lubrizol Corporation; and SYN-O-AD ® 8478, a 70%/30% blend of tri (2,4,6-tri-t-butyl phenyl) phosphate/triphenyl phosphate manufactured by the Stauffer Chemical Company.

The EP additives comprising the claimed subject matter of this invention are mixtures comprised of various components. These mixtures are comprised of (A) tolyltriazole or substituted derivatives thereof, (B) an amine and (C) a third component which is (i) an ethoxylated phosphate ester (Antara LP-700 type), or (ii) a phosphate alcohol (ZELEC 3337 type), or (iiii) a zinc dialkyldithiophosphate (Lubrizol 5139, 5604, 5178, 5186 type), or (iv) a mercaptobenzothiazole, or (v) a 2,5-dimercapto-1,3,4-triadiazole derivative (Curvan 826) or a mixture thereof.

The preferred amines (B) are the propoxylated amines such as Jeffamine ® M-600 of Texaco, Inc., having the structure

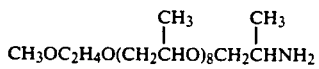

The preferred ethoxylated phosphate esters are the water soluble compositions having a phosphorus content of from about 4 to 10 percent, preferably 5 to 7 percent, such as Antara ® LP-700 of GAF (polyoxyethylene phenyl ether phosphate). Optionally the EP additive package can contain other components which will not have a deleterious effect on the antiwear properties of the lubricant composition.

The EP additives mixture preferably contains about 2 parts by weight of component (C) and about 3 parts by weight of component (B) per one part by weight of component (A). One can, if desired, modify these values; however, any modification should be made with the recommendation that after addition of the EP additives mixture to the PAG the resulting lubricant mixture should contain from about 0.1% to about 2% by weight of component (C) and that for every part of component (C) in the EP additives mixture there should be present from 0.5 parts to 2 parts of component (B); further, the lubricant mixture should preferably have from 0.01 to 0.1 weight percent of the tolyltriazole therein.

The EP additives mixtures of this invention can be added to known polyalkyleneoxy lubricant composition to improve its lubricity and antiwear properties. The polyalkleneoxys can be monohydroxylic, polyhydroxylic (e.g., 2 to about 10 or more hydroxyl groups, preferably 2 to 4 hydroxyl groups) or capped, and they can be random or block in structure, all of these structures are well known to those skilled in the art and need no further discussion herein.

EP additives may also be used in conjunction with some of the oxidation and thermal stability improvers and/or corrosion inhibitors also disclosed in Table D of U.S. Pat. No. 4,755,316. Such a preferred blend of additives is MLX-788, a proprietary mixture of Union Carbide Corporation containing a phosphate and two amine-containing compounds.

DESCRIPTION OF PREFERRED EMBODIMENTS

As stated previously, the tetrafluoroethanes, e.g. HFC-134a, and HFC-134 and pentafluoroethane, HFC-125, particularly HFC-134a, have physical characteristics which allow substitution for CFC-12 with only a minimum of equipment changes in compression refrigeration. They could be blended with each other, as well as with other refrigerants including CFC-12($CCl_2F_2$, HCFC-22 ($CHClF_2$), HFC-152A($CH_3CHF_2$), HCFC-124($CHClFCF_3$), HCFC-124a($CHF_2CClF_2$), HCFC-142b($CH_3CClF_2$), HFC-32($CH_2F_2$), HFC-143a($CH_3CF_3$), HFC-143($CHF_2CH_2F$), HFC-125($CF_3CHF_2$) and FC-218($CF_3CF_2CF_3$); and for purposes of the present invention such blends are not excluded. However, only those blends which are miscible with the lubricants of this invention in the range of −40° C. to at least +20° C. are included.

HFC-134a, the preferred tetrafluoroethane refrigerant, may be prepared by any of the methods disclosed in the prior art; e.g., U.S. Pat. No. 2,745,886; 2,887,427; 4,129,603; 4,158,675; 4,311,863; 4,792,643, and British 1,578,933 and 2,030,981, which are incorporated herein by reference.

The most preferred mono-hydroxyl polyalkylene glycol for use in this invention is based on the random polymerization of a 50/50 weight percent mixture of ethylene oxide and propylene oxide initiated with n-butanol. Although the amount of ethylene oxide can preferably range from 25 to 75 weight % of the ethylene oxide/propylene oxide composition and the viscosity can range from about 100 to 1200 SUS viscosity of 100° F., preferably 400 to 1200 SUS, the most preferred PAG's are the "50HB400" to "50HB660" ("400" and "660" representing the SUS viscosity at 100° F.; "H" representing "hydrophyllic"; "B" representing the butanol initiator; and "50" indicated the presence of 50 weight % ethylene oxide units) that are manufactured by the Union Carbide Corporation. The process of their manufacture is described in the 1986 edition of the Encyclopedia of Polymer Science and Engineering.

Although the preferred 50HB500 oil is not completely miscible with HFC-134a at condenser temperatures above 50° C., it meets the miscibility requirements to 50° C. and all the other requirements for automotive air conditioning. Its viscosity index, pour point, stability, lubricity, and miscibility with HFC-134a down to −50° C. are quite satisfactory. Furthermore, the use of an extreme pressure oil additive such as those mentioned previously improves the bearing-wear and load-carrying capability significantly Specifically, the lubricants used in the compositions of this invention, and in the invented method for providing of lubrication in compression refrigeration and air-conditioning equipment have the following characteristics;

Viscosity at 100° F.

100 to 1200 SUS, preferably 400 to 1200 SUS, most preferably about 500 SUS for automotive air-conditioning;

Viscosity Index

>90, preferably 150 to 250 or higher;

Pour Point

<−20° C. preferably −20° C. to about −50° C. and −33° C. for the 100 SUS and 1200 SUS oils, respectively;

Solubility of Miscibility Range

100% from at least 20° C. to less than −10° C. for 1-99 weight percent of HFC-134a in mixture with the lubricant;

Four-ball wear test with a specific set of steel balls and saturated with HFC 134a; scar wear and coefficient of friction equal to or less than that for the oils currently used with CFC-12 in automotive air-conditioning, i.e., 0.37 mm scar wear and 0.07 friction coefficient when saturated with CFC-12 at atmospheric pressure;

"Falex" load-failure test with a specific type of steel for the V-block and pin; the fail load equal to or greater than that for the CFC/refrigerant oil combinations, i.e. 1300 lbs when saturated with CFC-12 at atmospheric pressure.

1. Solubility of Refrigerant in Lubricants

Six ml. blends of refrigerant and lubricant were used for the solubility studies. Generally, the mixtures contained 30, 60 and 90 wt.% refrigerant. In some instances, more compositions were made to better define the miscible/immiscible region. These air-free mixtures were contained in sealed Pyrex® tubes (7/16" I.D. ×5.5", ca. 12.5 cc capacity). The refrigerant/lubricant solubilities were determined by completely immersing the tube in a bath at each test temperature for a minimum of 15 minutes and providing agitation to facilitate mixing and equilibration. The accuracy of determining the temperatures where the refrigerant/lubricant blend became either miscible or immiscible was about ±2° C. The refrigerant/lubricant blends were called immiscible when the blend acquired and retained "schlieren" lines; became hazy or cloudy; formed floc; or formed two liquid layers.

2. Stability of Refrigerant and Lubricant

Three ml. of refrigerant and 0.3 ml. of lubricant plus three metal coupons (steel 1010/copper/aluminum 1100-2⅜"×¼"×1/16", 120-grit surface finish) were charged and sealed in a Pyrex® tube (7/16" I.D. ×5.5", ca. 12.5 cc volume) under anaerobic conditions. The specimens were tied together at the top end with copper wire, with copper-wire rings between the metals to separate the metals at the top end. The tubes were stored vertically at 268° C. for 11.8 days. Afterwards, the tube contents were examined for appearance changes. The refrigerants were then transferred to gas-sampling bulbs for analysis by gas chromatography for the decomposition product of HFC-134a) or for HCFC-22 (CFC-12 decomposition product). These results were then converted to their equivalents in terms of HF and HCl generated.

3. Lubricity a. Four-ball Wear Test

The procedure is described fully in ASTM D4172. The method was modified as follows: A load of 20 Kg at 1200 RPM was put on the steel 52100 balls immersed in 10 ml. of lubricant. The refrigerant, HFC-134a or CFC-12, was bubbled through a Teflon® capillary tube into the lubricant at the rate of 0.75 standard cu. ft./hr. to provide one atmosphere of pressure of refrigerant gas over the lubricant and a gas-saturated lubricant.

b. Falex Pin/V-Block Load-to-Failure Test: The procedure is described fully in ASTM D3233. The V-Block was made of AISI C-1137 steel (HRC-20 to 24 hardness, 5 to 10 microinches surface finish). The test pin was made of AISI 3135 steel (HRB-87 to 91 hardness, 5 to 10 microinches surface finish). These tests were also run with refrigerant gas bubbling through the oil as in the four-ball wear test.

4. Viscosity and Viscosity Index a. Viscosity is a property that defines a fluid's resistance to shearing force. It is expressed in terms of absolute viscosity, kinematic viscosity or Saybolt Seconds Universal viscosity (SSU), depending on the method by which it is determined. Conversion from SSU to mm²/s (centistokes) can be readily made from tables contained in ASTM D-445, but it is necessary to known the density to convert kinematic viscosity to absolute viscosity. Refrigeration oils are sold in viscosity grades, and ASTM has proposed a system of standardized viscosity grades for industry-wide usage (D-2422).

b. Viscosity Index is a measure of the amount of change experienced by an oil with temperature. Viscosity decreases as the temperature increases and increases as the temperature decreases. The relationship between temperature and kinematic viscosity is represented by:

$$\log \log (v+0.7) = A + B \log T$$

where
v = kinematic viscosity, mm²/s (CST)
T = thermodynamic temperature (kelvin)
A,B = constants for each oil This relationship is the basis for the viscosity temperature charts published by ASTM and permits a straight line plot of viscosity over a wide temperature range. This plot is applicable over the temperature range in which the oils are homogeneous liquids.

The slope of the viscosity-temperature lines is different for different oils. The viscosity-temperature relationship of an oil is described by an empirical number called the Viscosity Index (VI) (ASTM D-2270). An oil with a high viscosity index (HVI) shows less change in viscosity over a given temperature range than an oil with a low viscosity index (LVI).

5. Pour Point

Any oil intended for low temperature service should be able to flow at the lowest temperature likely to be encountered. The procedure for determining pour point is described in ASTM D-97.

The invention will be more clearly understood by referring to the following experiments which are presented in Tables I-XI.

1. Solubility Data

Tables I and II summarize the solubility data for the mono-functional random polyalkylene glycol-tetra-fluoroethane refrigerant compositions of this invention. The PAG's contained 25-75% ethylene oxide units and, correspondingly 75-25% ethylene oxide units and their preparation involved butanol and methanol initiators.

The solubility data indicate that the PAG's used in the invention provided superior results when compared at equivalent viscosities, to:

(1) mono-functional PAG's containing 100% propylene oxide units as shown in Table III.

(2) PAG's with less than one —OH group as shown in Table IV.

(3) the PAG with two —OH groups as shown in Table V.

(4) PAG's with three —OH groups, three of which were initiated with glycerine (G) as shown in Table VI.

In Table VII, data showing the immiscibility of HFC-134a with those oils typically used with CFC-12 in automotive air-conditioning, e.g. paraffinic (BVM-100N) and naphthenic (Suniso 5GS), as well as other alternative oils, are presented.

2. Stability Data

The stability of compositions of HFC-134a with the PAG's used in this invention are significantly better than that of the compositions of CFC-12 with the oils currently used in automotive air-conditioning as shown in Table VIII. The tests in Table VIII approximate the result obtained after operating an automobile for ten (10) years.

3. Additives for the PAG's used in this invention

It is known in the state of the art that additives may be used in lubricants to enhance their performance. These additives may include any one or combination of the following to meet the specific functional requirements for the types of compressor employed; extreme pressure additive, anti-wear additive, antioxidant, high-temperature stabilizer, corrosion inhibitor, detergent and anti-foaming agent. Although all of these additives are not used in these experiments, they are not meant to be excluded as additives for the PAG's especially if they are not significantly detrimental to the solubility of the HFC-134a in the PAG's.

EP additives alone and in combination with other additives, which are soluble in the 50HB PAG's are shown in Table IX. The superiority of the lubricity of the 50HB500/HFC-134a with and without the additive package over the naphthenic and paraffinic oils currently used in automotive air-conditioning is shown in the four-ball wear tests (Table X). A more visible advantage that the additive package gives to the PAG lubricant is shown in the load-to-failure tests (Table XI).

As a supplement to the above additives, blends of the low and high viscosity 50HB PAG's may also be used to enhance the lubricating quality for the oil under a variety of compressor requirements. Blends of the 50HG PAG's may also be made with other PAG's (0, 1,2,3,etc. functional groups) to meet special lubrication needs.

The tables, referred to in the foregoing paragraphs, are presented hereinafter.

TABLE I

SOLUBILITY OF REFRIGERANT (HFC-134a) WITH LUBRICANT
(PAG containing one functional - OH group)
(Test Range: 93 to −50° c.)

| Expt. No. | Lubricant | Miscible Range (°C.) for Indicated Concentrations of HFC-134a in Oil (Wt. %) | | |
|---|---|---|---|---|
| | | 30% | 60% | 90% |
| 1 | 50HM350 | 93 to −50 | 60 to −50 | 51 to −50 |
| 2 | 75HB350 | 93 to −10 | 69 to −50 | 44 to −50 |
| 3 | 50HB260 | 93 to −50 | 93 to −50 | 56 to −50 |
| 4 | 50HB400 | 93 to −49 | 69 to −50 | 43 to −50 |
| 5 | 50HB660 | 50 to −50 | 40 to −50 | 30 to −50 |
| 6 | 25HB530 | 93 to −5 | 58 to −50 | 37 to −50 |
| 7 | 50HB500 blend (30/70 v/v 50HB260/ 50HB660 | 93 to −50 | 67 to −50 | 39 to −50 |
| 8. | 510SUS blend (50/50 v/v 50HB500/ LB525**) | 93 to −50 | 52 to −50 | 31 to −50 |

*Key for determining lubricant:
50HM350: "50" = 50/50 wt. % polyoxyethylene/polyoxypropylene; "H" = hydrophillic
"M" = methanol - initiated polymer; "350" = 350SUS viscosity at 100° F.;
75HB350: "75" = 75 wt. % polyoxymethylene; B = butanol - initiated polymer; etc.
**No first number = 0/% polyoxyethylene; "L" = lipophyllic

TABLE II

Solubility of HFC-134a with 50HB500*
(Test range: 93 to −50° C.)

| Expt. No. | Wt. % HFC in HFC/Lubricant Mix | Miscible Range (°C.) |
|---|---|---|
| 9 | 30 | 93 to −50 |
| 10 | 40 | 93 to −50 |
| 11 | 60 | 55 to −50 |
| 12 | 90 | 42 to −50 |
| 13 | 94 | 45 to −50 |
| 14 | 98 | 50 to −50 |
| 15 | 99 | 60 to −50 |

*50HB500: "50" = 50/50 wt. % polyoxyethylene/polyoxypropylene
"H" = hydrophillic
"B" = butanol - initiated polymer
"500" = 500 SUS viscosity at 100° F.

TABLE III

Solubility of HFC-134a with Mono-Functional PAG's
Containing No Ethylene Oxide Unit
(Test Range: 93 to −50° C.)

| Expt. No. | Lubricant | Wt. % HFC in HFC/Oil Mix | Miscible Range (°C.) |
|---|---|---|---|
| Control A | LB-165** | 30,60 | 93 to −50 |
| | | 70 | 80 to −50 |
| | | 73,90 | 73 to −50 |
| | | 94 | 68 to −50 |
| Control B | LB-285** | 68 | 70 to −50 |
| | | 80 | 40 to −50 |
| | | 94 | 53 to −50 |
| | | 97 | 58 to −50 |
| | | 99 | 58 to −50 |
| Control C | LB-525** | 30 | 40 to −50 |
| | | 60 | 36 to −40 |
| | | 90 | −7 to −23 |

*Key for determining lubricant
L = lipophyllic
B = butanol - initiated polymer
no first number = 0% ethylene oxide unit or 100% propylene oxide units
165, 285 and 525 = SUS viscosity at 100° F.
**Manufactured by Union Carbide Corporation

TABLE IV

Solubility of HFC-134a with PAG's
Containing Less than One Functional OH Group
(Test Range: 93 to −50° C.)

| Expt. No. | Oil | Miscible Range (°C.) for Shown Concs. of HFC in Oil (Wt. %) | | |
|---|---|---|---|---|
| | | 30% | 60% | 90% |
| Control D | 50HG300 (+3 acetoxy caps)* | 93 to −10 | 93 to −10 | 67 to −50 |
| Control E | 50H400 (+2 acetoxy caps)** | 93 to −10 | 93 to −10 | 53 to −50 |
| Control F | 50HB400 (+1 acetoxy cap)*** | 93 to −10 | 25 to −50 | 25 to −50 |
| Control G | 50HB500 (+0.5 butyl cap)*** | Insoluble | Insoluble | Insoluble |
| Control H | 50HB500 (+0.91 methyl cap)*** | 93 to 45 | 93 to 45 | Insoluble |
| Control I | 50HB500 (+0.95 methyl cap)*** | 93 to 50 | 93 to 75 | Insoluble |

*50HG300 (+3 acetoxy caps) key: 50 = 50/50 wt. % polyoxyethylene/polypropylene
H = hydrophyllic
G = PAG Initiated with glycerol
300 = 300 SUS viscosity at 100° F.
3 acetoxy caps = the 3 OH groups were capped with the acetoxy group from acetic anhydride
**Polymer initiated with diethylene glycol
***Polymer initiated with butanol

TABLE V

Solubility of HFC-134a with Polyoxypropylene Diols
(Test Range: 93 to −50° C.)

| Expt. No. | Oil | Viscosity at 100° F. (SUS) | Wt. % HFC-134a | Miscible Range (°C.) |
|---|---|---|---|---|
| Control J | Polyoxypropylene diol* | 554 | 30 | 93 to −50 |
| | | | 60 | 90 to −50 |
| | | | 90 | 31 to −50 |
| Control K | Polyoxypropylene diol** | 154 | 30 | 93 to −5 |
| | | | 60 | 45 to −38 |
| | | | 90 | 93 to −50 |

*Manufactured by CPI Engineering Co.
**"NIAX PPG-425" manufactured by Union Carbide Corp.

TABLE VI

Solubility of HFC-134a with PAG's Containing Three Functional OH Groups
(Test Range: 93 to −50° C.)

| Expt. No. | Oil | Viscosity at 100° F. SUS) | Wt. % HFC-134a | Miscible Range (°C.) |
|---|---|---|---|---|
| Control L | 50HG400* | 400 | 30 | 93 to 25 |
| | | | 60 | 25 to 5 |
| | | | 90 | 25 to −50 |
| Control M | 50HG450* | 450 | 30 | 25 to −50 |
| | | | 60 | 25 to −50 |
| | | | 90 | 20 to −50 |
| Control N | 100HG550 | 550 | 30 | 24 to −40 |
| | | | 60 | Insoluble |
| | | | 90 | Insoluble |
| Control O | CH$_3$C(CH$_2$OCH$_2$CH$_2$—OCH$_2$CH$_2$OH)$_3$ | 562 | 30 | Insoluble |
| | | | 60 | Insoluble |
| | | | 90 | Insoluble |

*G = Glycerol-initiated polymer

TABLE VII

Solubility of HFC 134a with Available Miscellaneous Refrigerant Oils
(Test Range: 93 to −50° C.) unless noted otherwise)

| Expt. No. | Oil | Miscible Range (°C.) for Indicated Concentration (Wt %) of HFC-134a In Lubricant | | |
|---|---|---|---|---|
| | | 30% | 60% | 90% |
| | Dipentaerythritol Esters of Fatty Acids (c) | | | |
| Control P | 240 SUS | −50+ | −4+ | 40+ |
| Control Q | 290 SUS | −44+ | −17+ | 70+ |
| | PEG Esters of Fatty Acids (d) | | | |
| Control R | 144 SUS | −21+ | 54 (a) | 54 (a) |
| Control S | 620 SUS | −4+ | 4+ | 70+ |
| Control T | 830 SUS | −6+ | 70+ | 70+ |
| | Naphthenic Oils (e) | | | |
| Control U | Sunisco ® 5GS (500 SUS, 38% Aromatic) | 54 (a) | 54 (a) | 54 (a) |
| Control V | Witco 500 (500 SUS) | 54 (a) | 54 (a) | 54 (a) |
| Control W | Expt. Oil (520 SUS, 47% aromatic) | 54 (a) | 54 (a) | 54 (a) |
| Control X | Exp. Oil (529 SUS, 75% aromatic) | 54 (a) | 54 (a) | 54 (a) |
| | Paraffin Oil (f) | | | |
| Control Y | BVM-1-N (500 SUS) | 54 (a) | 54 (a) | 54 (a) |
| | Alkyl Benzene | | | |
| Control Z | Zerol 300 (300 SUS) (g) | 54 (a) | 54 (a) | 54 (a) |
| Control A' | DN600 (125 SUS) (b) | 54 (a) | 54 (a) | 54 (a) |
| Control B' | Atmos HAB15F (78 SUS) (i) | 55+ | Ins (b) | Ins (b) |
| | Silicone Oils | | | |
| Controls C', D', E' | L-45 Oils (163, 231, & 462 SUS (j) | Ins (b) | Ins (b) | Ins (b) |

+ - Soluble at and above shown temperature.
(a) - May be soluble above shown temperature.
(b) - Completely insoluble from 93 to −50° C.
(c) - Hercules
(d) - CPI Engineering
(e) - Witco Chemical Co.
(f) - BVM Associates
(g) - Shrieve Chemical Co.
(h) - Conoco
(i) - Nippon Oil KK
(j) - Union Carbide

TABLE VIII

Stability of HFC-134a in Contact With Lubricant Plus Coupled
Steel - 1010/Copper/Aluminum - 1100 at 268° F. for 11.8 days

| Expt. No. | Refrigerant | Lubricant | Cl⁻ vs. F⁻* Generated (ppm) | Visual-Effect Liquid | Rating Steel | Cu | Al |
|---|---|---|---|---|---|---|---|
| 16 | HFC-134a | 50HB500 | <0.2* | 0 | 0 | 0 | 0 |

TABLE VIII-continued

| | | | | | | | |
|---|---|---|---|---|---|---|---|
| 17 | HFC-134a | 50HB260 | <0.2* | 0 | 0 | 0 | 0 |
| Control F' | CFC-12 | Naphthenic Oil | 423 | 4 | 3 | 2 | 2 |
| Control G' | CFC-12 | Paraffinic Oil | — | 0 | 3 | 0 | 0 |
| Control H' | CFC-12 | Witco 500 | 32 | 0 | 1 | 0 | 0 |

*No HFC-135a decomposed.
a - Key to ratings

| Rating | Visual Changes |
|---|---|
| 0 | None |
| 1 | Slight, acceptable change<br>Steel - Tarnished |
| 2 | Borderline change<br>Cu - dark tarnish plus moderate corrosion - 25% of surface<br>Al - etched |
| 3 | Slight unacceptable change<br>Steel - brown deposit/gray film - 100% of surface |
| 4 | Moderate, unacceptable change<br>Liquid - clear brown plus black precipitate |

TABLE IX

Solubility of HFC-134a with PAG Lubricant and Containing Extreme Pressure (EP) Additives
(Test Range: 93 to −50° C.)

| Expt. No. | Lubricant | Additive* | 30% | 60% | 90% |
|---|---|---|---|---|---|
| 18 | 50HB500 | 0 | 93 to −50 | 55 to −50 | 42 to −50 |
| 19 | 50HB500 | 1 | 93 to −50 | 65 to −50 | 40 to −50 |
| 20 | 50HB500 | 2 | 93 to −50 | 65 to −50 | 38 to −50 |
| 21 | 50HB500 | 3 | 93 to −10 | 65 to −50 | 38 to −50 |
| 22 | 50HB260 | 0 | 93 to −10 | 63 to −50 | 56 to −50 |
| 23 | 50HB260 | 1 | 93 to −50 | 93 to −50 | 48 to −50 |
| 24 | 50HB260 | 2 | 93 to −50 | 93 to −50 | 48 to −50 |
| 25 | 50HB260 | 3 | 93 to −20 | 73 to −50 | 50 to −50 |

*EP Additive Key:
0 = none;
1 = 0.6 wt. % "MLX-788" a three-component additive from Union Carbide;
2 = 1.3 wt. % "SYN-O-AD 8478", butylated triphenyl phosphate/triphenylphosphate from Stouffer Chemical;
3 = 0.1 wt # "Lubrizol 1097," zinc dialkyl dithio-phosphate from Lubrizoil Corporation

TABLE X

Lubricity of Lubricants Under One Atmosphere of Refrigerant Gas Pressure in a Four-Ball Wear Test

| Expt. No. | Refrigerant | Lubricant | Ball Scar Wear* (mm) (a) | Coefficient* of Friction (b) |
|---|---|---|---|---|
| 26 | HFC-134a | 50HB500 | 0.303 | 0.023 |
| 27 | HFC-134a | 50HB500 Plus EP additive ("MLX-788") | 0.357 | 0.030 |
| Control I' | CFC-12 | Naphthenic Oil | 0.373 | 0.072 |
| Control J' | CFC-12 | Paraffinic Oil | 0.368 | 0.071 |

(a) = 0.028 std. deviation
(b) = 0.006 std. deviation
*the smaller the number, the better

TABLE XI

Load-Carrying Ability of Lubricants Under One Atmosphere of Refrigerant Gas Pressue in Falex Pin/V-Block Test

| Expt. No. | Refrigerant Gas | Lubricant | Fail Load* (lbs) | Torque in Fail* (in-lbs.) |
|---|---|---|---|---|
| 28 | HFC-134a | 50HB500 | 1750 | 28 |
| 29 | HFC-134a | 50HB500 plus EP additive ("MLX-788") | 4150 | 46 |
| Control K' | CFC-12 | Naphthenic Oil | 1250 | 24 |
| Control L' | CFC-12 | Paraffinic Oil | 1300 | 26 |

*The larger the number, the better.

The additive packages were usually prepared having a ratio of components C: B: A of 2:3:1 and these were added to the PAG lubricant and evaluated by the test procedures previously described. In some cases the antiwear additives were tested without the presence of component A. In some instances comparisons were made with unmodified PAG (50-HB-600 or PPG-1025). The test procedure used was the Falex Pin/V-Block Wearer Test using either a Phosphorus/Bronze V-block or a #8 Steel V-Block.

In Table XII a variety of different additives, 1 through 14, was evaluated in an HFC-134a atmosphere in the Test Formulation shown at the top of the Table and compared to control compositions A and B. Control A was the polyalkylene glycol 50-HB-660 and Control B was a mixture of

| | |
|---|---|
| 50-HB-660 | 99.4% |
| Antara LP-700 | 0.2 |
| Jeffamine M-600 | 0.3 |
| Tolyltriazole | 0.1 |

As shown in the table the additives, 1, 2, 4, 9 and 13, which fall within the scope of this invention, when added to a concentration of 0.2% show higher failure loads and therefore superior lubricating properties compared to Control A or the other materials tested. Note also that Control B is significantly better than either Control A or additive 1; this demonstrates one of the benefits contributed by the presence of tolyltriazone (or similar compounds) in the compositions.

Table XIII shows the effect of increased lubricity additive content of the lubricating performance of the Test Formulation. Comparison of this data with that presented in Table XII shows a significantly greater improvement for the MBT or LP-700 for the isostearic acid or the Dover DO-40.

Table XIV shows the effect of the additive compositions of this invention on the lubricity a different polyoxyalkylene base composition, polypropylene glycol PPG 1025. The data shows the addition of the additives of this invention to any base composition results in improved lubricity performance of such base.

Table XV shows the effect of the additive compositions of this invention in improving lubricity and antiwear properties. The materials were compared to unformulated PAG (50-HB-660) and to PAG formulated with a different phosphate compound (Syn-O-Ad®). As seen from the data the compositions of this invention impart higher "failure loads", which correlates with superior antiwear of extreme pressure (EP) lubrication properties. The word "none" in the tables indicates failure loads greater than 5000 pounds. No difference was observed between the one and five minute purges, so one minute purges were used. The relative ranking of the test compositions was similar regardless of the atmosphere in which the test was performed (air, CFC-12, HFC-134a). For reason all subsequent tests were performed in an air environment.

Table XVI shows the comparison of a different composition of this invention in air to unformulated PAG and to a PAG formulated with the Syn-O-Ad phosphate compound. Again superior antiwear properties were achieved with the phosphate alcohol Zelec 3337 as compared to PAG alone or the PAG plus Syn-O-Ad phosphate compound-containing composition.

Table XVII shows the effect of the additive composition of this invention in air on the weight loss, of the bronze blocks and compares it to the weight loss effect of PAG alone (50-HB-660). The data clearly show a significantly lower weight loss in the two tests (a and b) performed, indicative of superior lubricating properties achieved through the use of the additive compositions of this invention in conjunction with a PAG.

Table XVIII shows the effect of an additive composition of this invention containing a phosphate alcohol (Zelec 3337) in air on the weight loss of the bronze block. Superior results are again shown versus the controls 50-HB-660 alone and the 50-HB-660 composition containing the Syn-O-Ad.

Table XIX shows the effect of the LP700 additive of this invention on the lubricity of a capped polyalkyleneoxy lubricant composition.

TABLE XII

| FALEX PIN & V - BLOCK WEAR TEST | | |
| --- | --- | --- |
| Steel pins and bLocks run in an HFC-134a atmosphere | | |
| Test Formulation: | 50-HB-660 | 99.5% |
| | Jeffamine M-600 | 0.3% |
| | Lubricity additive | 0.2% |

*Maximum failure load on the wear test 5000 lbs.

| Lubricant | Failure load, lbs |
| --- | --- |
| A) Control | 1500 |
| B) Control | 2750 |
| 1) LP-700 | 2000 |
| 2) LUBRIZOL 5604 | 2000 |
| 3) IRGALUBE TPPT | 1500 |
| 4) ZELEC 3337 | 2000 |
| 5) Pelargonic Acid | 1500 |
| 6) Isostearic Acid | 1500 |

TABLE XII-continued

| FALEX PIN & V - BLOCK WEAR TEST | |
| --- | --- |
| 7) Capric Acid | 1400 |
| 8) EMPOL 1022 | 1800 |
| 9) MBT | 3500 |
| 10) PAROIL 150LV | 1450 |
| 11) Dover DO-40 | 1500 |
| 12) Dover DO-160-HV | 1350 |
| 13) CURVAN 826 | 4250 |
| 14) EMERY 2958 | 1450 |

TABLE XIII

| FALEX PIN & V - BLOCK TESTS | | |
| --- | --- | --- |
| Steel pins and blocks run in an HFC-134a atmosphere | | |
| Test Formulation: | 50-HB-660 | 97.5% |
| | Jeffamine M-600 | 1.5% |
| | Lubricity Additive | 1.0% |

| Lubricant | Failure load, lbs |
| --- | --- |
| A) Control | 1500 |
| B) Control | 2500 |
| 1) LP-700 | 4850 |
| 6) Isostearic Acid | 2500 |
| 9) MBT | 4750 |
| 11) Dover DO-40 | 1500 |

TABLE XIV

| FALEX PIN & V - BLOCK WEARS TESTS | | |
| --- | --- | --- |
| Steel pins and blocks run in an HFC-134a atmosphere | | |
| TEST FORMULATION: | PPG 1025 | 99.5% |
| | Jeffamine M-600 | 0.3% |
| | Lubricity Additive | 0.2% |

| Lubricant | Failure load, lbs |
| --- | --- |
| A) Control | 1500 |
| B) Control | 2700 |
| C) Control* | 1450 |
| 1) LP-700 | 2000 |
| 6) Isostearic Acid | 1150 |
| 9) MBT | 2250 |
| 11) Dover DO-40 | 1150 |

*C = PPG 1025, unformulated

TABLE XV

FALEX PIN & V-BLOCK WEAR TEST
Effect of different Atmospheres
SAE 3135 Steel Pin
Falex ® #8 Steel V-Blocks

| Sample (or composition, wt %) | | Atmosphere* | Purge Time** | Failure Load (lbs.) |
| --- | --- | --- | --- | --- |
| 50-HB-660 | 100% | air | 1 min | 1500 |
| 50-HB-660 | 99.4 | air | 1 min | 2250 |
| Lubrizol #5604 | 0.2 | | | |
| Jeffamine M-600 | 0.3 | | | |
| Tolyltriazole | 0.1 | | | |
| 50-HB-600 | 99.2 | air | 1 min | 2000 |
| Antara LP-700 | 0.2 | | | |
| Jeffamine M-600 | 0.3 | | | |
| Tolyltriazole | 0.1 | | | |
| MBT | 0.2 | | | |
| 50-HB-660 | 99.4 | air | 1 min | 1550 |
| Syn-O-Ad | 0.2 | | | |
| Jeffamine M-600 | 0.3 | | | |
| Tolyltriazole | 0.1 | | | |
| 50-HB-660 | 99.4 | air | 1 min | 2500 |
| Antara LP-700 | 0.2 | | | |
| Jeffamine M-600 | 0.3 | | | |
| Tolyltriazole | 0.1 | | | |
| 50-HB-660 | 100% | CFC-12 | 1 min | 1500 |
| 50-HB-660 | 100% | CFC-12 | 5 min | 1500 |
| 50-HB-660 | 99.4 | CFC-12 | 1 min | none |
| Lubrizol #5604 | 0.2 | | | |
| Jeffamine M-600 | 0.3 | | | |
| Tolyltriazole | 0.1 | | | |

TABLE XV-continued

FALEX PIN & V-BLOCK WEAR TEST
Effect of different Atmospheres
SAE 3135 Steel Pin
Falex ® #8 Steel V-Blocks

| Sample (or composition, wt %) | | Atmosphere* | Purge Time** | Failure Load (lbs.) |
|---|---|---|---|---|
| MBT | 0.2 | | | |
| 50-HB-600 | 99.2 | CFC-12 | 1 min | none |
| Antara LP-700 | 0.2 | | | |
| Jeffamine M-600 | 0.3 | | | |
| Tolyltriazole | 0.1 | | | |
| 50-HB-660 | 99.4 | CFC-12 | 1 min | 1550 |
| Syn-O-Ad | 0.2 | | | |
| Jeffamine M-600 | 0.3 | | | |
| Tolyltriazole | 0.1 | | | |
| 50-HB-600 | 99.2 | CFC-12 | 1 min | none |
| Antara LP-700 | 0.2 | | | |
| Jeffamine M-600 | 0.3 | | | |
| Tolyltriazole | 0.1 | | | |
| MBT | 0.2 | | | |
| 50-HB-600 | 100% | CFC-12 | 1 min | 1500 |
| 50-HB-660 | 99.4 | HFC-134a | 1 min | 2500 |
| Lubrizol #5604 | 0.2 | | | |
| Jeffamine M-600 | 0.3 | | | |
| Tolyltriazole | 0.1 | | | |
| 50-HB-600 | 99.2 | HFC-134a | 1 min | 4000 |
| Antara LP-700 | 0.2 | | | |
| Jeffamine M-600 | 0.3 | | | |
| Tolyltriazole | 0.1 | | | |
| MBT | 0.2 | | | |
| 50-HB-660 | 99.4 | HFC-134a | 1 min | 1550 |
| Syn-O-Ad | 0.2 | | | |
| Jeffamine M-600 | 0.3 | | | |
| Tolyltriazole | 0.1 | | | |
| 50-HB-660 | 99.4 | HFC-134a | 1 min | 4000 |
| Antara LP-700 | 0.2 | | | |
| Jeffamine M-600 | 0.3 | | | |
| Tolyltriazole | 0.1 | | | |

*Tests in specific atmospheres were run by bubbling the gas through the lubricant at atmospheric pressure during the duration of the experiment.
**The gas was purged through the lubricant prior to running the test in order to displace any dissolved oxygen.

TABLE XVI

FALEX PIN & V-BLOCK WEAR TEST
SAE 3135 Steel Pin
Falex ® #8 Steel V-Blocks

| (Sample or composition, wt %) | | Failure Load (lbs.) |
|---|---|---|
| 50-HB-660 | 100 | 2000 |
| 50-HB-660 | 99.4 | 2500 |
| Antara LP-700 | 0.2 | |
| Jeffamine M-600 | 0.3 | |
| Tolyltriazole | 0.1 | |
| 50-HB-660 | 99.4 | 3000, 2750 |
| DuPont Zelec 3337 | 0.2 | |
| Jeffamine M-600 | 0.3 | |
| Tolyltriazole | 0.1 | |
| 50-HB-660 | 99.4 | 1750 |
| Syn-O-Ad | 0.2 | |
| Jeffamine M-600 | 0.3 | |
| Tolyltriazole | 0.1 | |

*Test was run with no gas being bubbled through the lubricant.

TABLE XVII

FALEX PIN & V-BLOCK WEAR TEST
SAE 3135 Steel Pin
Falex ® Phosphorus/Bronze V-Blocks

| | | Weight Loss-grams | |
|---|---|---|---|
| Sample (or composition, wt %) | | a | b |
| 50-HB-660 | 100% | 0.0145 | 0.3730 |
| 50-HB-660 | 99.4 | 0.0089 | 0.0451 |
| Antara LP-700 | 0.2 | | |
| Jeffamine M-600 | 0.3 | | |
| Tolyltriazole | 0.1 | | |
| 50-HB-660 | 99.4 | 0.0069 | 0.1551 |
| Lubrizol #5604 | 0.2 | | |
| Jeffamine M-600 | 0.3 | | |
| Tolyltriazole | 0.1 | | |

Test was run with no gas being bubbled through the lubricant.

TABLE XVII

FALEX PIN & V-BLOCK WEAR TEST
SAE 3135 Steel Pin
Falex ® Phosphorus/Bronze V-Blocks

| | | Weight Loss-grams | |
|---|---|---|---|
| Sample (or composition, wt %) | | a | b |
| 50-HB-660 | 100% | 0.0517 | 0.0046 |
| 50-HB-660 | 99.4 | 0.0010 | 0.0011 |
| Antara LP-700 | 0.2 | | |
| Jeffamine M-600 | 0.3 | | |
| Tolyltriazole | 0.1 | | |
| 50-HB-660 | 99.4 | 0.0192 | 0.0018 |
| DuPont Zelec 3337 | 0.2 | | |
| Jeffamine M-600 | 0.3 | | |
| Tolyltriazole | 0.1 | | |
| 50-HB-660 | 99.4 | 0.0013 | 0.0014 |
| DuPont Zelec 3337 | 0.2 | | |
| Jeffamine M-600 | 0.3 | | |
| Tolyltriazole | 0.1 | | |
| 50-HB-660 | 99.4 | 0.0420 | 0.0024 |
| Syn-O-Ad | 0.2 | | |
| Jeffamine M-600 | 0.3 | | |
| Tolyltriazole | 0.1 | | |

Test was run with no gas being bubbled through the lubricant.

TABLE XIX

FALEX PIN & V - BLOCK WEAR TESTS
Steel pins and blocks run in an HFC-134a atmosphere

| TEST FORMULATION: | 50HB660 (capped)* | 99.4% |
|---|---|---|
| | Jeffamine M-600 | 0.3% |
| | Lubricity Additive | 0.2% |
| | Tolyltriazole | 0.1% |

| Lubricant | Failure load, lbs |
|---|---|
| A) Control | 1500 |
| B) Control | 2700 |
| D) Control** | 1500 |
| 1) LP-700 | 2250 |
| 6) Isostearic Acid*** | 1250 |

*Butyl capped
**D = 50HB500 (capped), unformulated
***Tolytriazole replaced with 50HB500 (capped)

What is claimed is:

1. An antiwear additive composition for refrigerant lubricants comprising:
    at least one member selected from the group consisting of (i) an ethoxylated phosphate ester, (ii) a phosphate alcohol, (iii) a zinc dialkyldithiophosphate, (iv) mercaptobenzothiazole and (v) 2,5-dimercapto-1,3,4-thiadiazole;
    a propoxylated amine; and
    a tolyltriazole.

2. An antiwear additive as claimed in claim 1 wherein said amine is

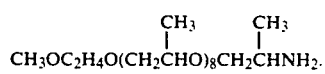

3. An antiwear additive composition as claimed in claim 1 wherein said ethoxylated phosphate ester is water soluble.

4. An antiwear additive composition as claimed in claim 3 wherein said ethoxylated phosphate ester is a polyoxyethylene phenyl ether phosphate.

5. A refrigerant lubricant composition comprising:
at least one polyoxyalkylene glycol which is monofunctional with respect to hydroxyl groups and based on 25% to 75% ethylene oxide and 75% to 25% propylene oxide, having an SUS viscosity at 100° F. of 100 to 1200; and
an effective amount of an antiwear additive sufficient to provide antiwear properties to said refrigerant lubricant composition comprising at least one member selected from the group consisting of (i) an ethoxylated phosphate ester, (ii) a phosphate alcohol, (iii) a zinc dialkyldithiophosphate, (iv) mercaptobenzothiazole and (v) a 2,5-dimercapto-1,3,4-thiadiazole propoxylated amine and a tolytriazole.

6. A refrigerant lubricant composition as claimed in claim 5 wherein said amine is

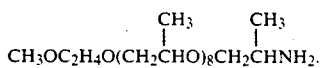

7. A refrigerant lubricant composition as claimed in claim 5 comprising from about 0.1 to 2.0% by weight of said antiwear additive.

8. A refrigerant lubricant composition as claimed in claim 5 comprising from about 0.5 to 2 parts of said amine per part of said antiwear additive.

9. A refrigerant lubricant composition as claimed in claim 5 comprising from about 0.01 to 0.1% by weight of said tolyltriazole.

10. A refrigerant lubricant composition as claimed in claim 5 comprising about 2 parts by weight of said antiwear additive and about 3 parts by weight of said amine per one part by weight of said tolyltriazole.

11. A refrigerant lubricant composition according to claim 5 wherein said polyalkyleneoxy lubricant is based on 40% to 60% ethylene oxide and 60% to 40% to propylene oxide.

12. A refrigerant composition comprising:

(a) a refrigerant comprising at least one compound selected from the group consisting of tetrafluoroethane and pentafluoroethane;
(b) a polyoxyalkylene glycol;
(c) an antiwear additive comprising at least one member selected from the group consisting of (i) an ethoxylated phosphate ester, (ii) a phosphate alcohol, (iii) a zinc dialkyldithiophosphate, (iv) mercaptobenzothiazole and (v) 2,5-dimercapto-1,3-4-thiadiazole; and
(d) a tolyltriazole.

13. A refrigerant composition as claimed in claim 12 wherein said polyoxyalkylene glycol is monofunctional with respect to hydroxyl groups and based on 25% to 75% ethylene oxide and 75% to 25% propylene oxide, having an SUS viscosity at 100° F. of 100 to 1200.

14. A refrigerant composition as claimed in claim 12 wherein said polyoxyalkylene glycol is polyfunctional with respect to hydroxyl groups.

15. A refrigerant composition as claimed in claim 12 wherein said polyoxyalkylene glycol is capped.

16. A refrigerant composition as claimed in claim 12 further comprising a propoxylated amine.

17. A refrigerant lubricant composition as claimed in claim 16 wherein said amine is

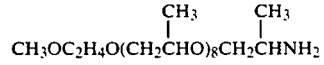

18. A refrigerant composition as claimed in claim 12 wherein comprises from about 10 to 50% by volume of said polyoxyalkylene glycol.

19. A refrigerant composition as claimed in claim 18 which comprises from about 10 to 20% by volume of said polyoxyalkylene glycol.

20. An antiwear additive composition for refrigerant lubricants comprising:
(i) a polyoxyethylene phenyl ether phosphate;
(ii) an amine having the following structure

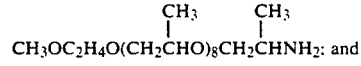

(iii) a tolyltriazole.

* * * * *